United States Patent [19]

Nimry et al.

[11] 4,410,658

[45] Oct. 18, 1983

[54] POLYIMIDES-AMIDES AND COPOLYIMIDES-POLYAMIDES FROM TETRAMETHYLCYCLOBUTANE-1,2,3,4-TETRACARBOXYLIC DIANHYDRIDE, DICARBOXYLIC ACIDS AND A MIXTURE OF DIAMINES

[75] Inventors: Tayseer S. Nimry, Wheaton; Ellis K. Fields, River Forest, both of Ill.

[73] Assignee: Standard Oil Company (Indiana), Chicago, Ill.

[21] Appl. No.: 427,016

[22] Filed: Sep. 29, 1982

Related U.S. Application Data

[63] Continuation-in-part of Ser. No. 286,696, Jul. 24, 1981, Pat. No. 4,358,579.

[51] Int. Cl.$^3$ .............................................. C08G 73/10
[52] U.S. Cl. ..................................... 524/600; 528/125; 528/128; 528/172; 528/188; 528/189; 528/206; 528/208; 528/220; 528/229; 528/352; 528/353

[58] Field of Search ............... 528/125, 128, 172, 188, 528/189, 206, 208, 220, 229, 352, 353; 524/600

[56] References Cited

PUBLICATIONS

Nakanishi et al., Aliphatic poly(amido acids) and Polyimides, Polymers 14, 440 (1973).

Primary Examiner—Lester L. Lee
Attorney, Agent, or Firm—Gunar J. Blumberg; William T. McClain; William H. Magidson

[57] ABSTRACT

Novel polyimide-amide polymers and copolymers and molding compositions are prepared from tetramethyl-cyclobutane-1,2,3,4-tetracarboxylic dianhydride, dicarboxylic acids and mixtures of diamines. Also glass and graphite filled polymers are prepared. The polyimide-polyamide polymers and copolymers are useful as engineering plastics.

26 Claims, No Drawings

POLYIMIDES-AMIDES AND COPOLYIMIDES-POLYAMIDES FROM TETRAMETHYLCYCLOBUTANE-1,2,3,4-TETRACARBOXYLIC DIANHYDRIDE, DICARBOXYLIC ACIDS AND A MIXTURE OF DIAMINES

This application is a continuation-in-part application of our Ser. No. 286,696, filed July 24, 1981, now U.S. Pat. No. 4,358,579.

BACKGROUND OF THE INVENTION

1. Field of the Invention

The field of this invention relates to copolyimides, polyimides, polyimides-amides and copolyimides-amides prepared from tetramethylcyclobutane-1,2,3,4-tetracarboxylic dianhydride (TMCDA) dicarboxylic acids and a mixture of diamines. These novel polyimides-amides, copolyimides-amides are useful in preparing molded articles, fibers, films, laminates and coatings.

2. Background

It is known to make copolyimides from pyromellitic dianhydride and aromatic diamines. This is disclosed in U.S. Pat. No. 3,179,634 (1965). British Pat. No. 570,858 discloses various processes for making fiber forming polymers. The Japanese Patents listed below disclose the preparation of polyimides starting with cyclobutane-1,2,3,4-tetracarboxylic dianhydride.

Nos. JA 7123917-S27, JA 7137733-S44, JA 7137734-S44, JA 7219710-T23, and JA 72199098-T23. The article by F. Nakanishi and M. Hasegawa, Polymers, 14, 440 (1973) discloses the use of cyclobutane-1,2,3,4-tetracarboxylic dianhydride and 1,3,-dimethylcyclobutane-1,2,3,4-tetracarboxylic dianhydride in the preparation of polyimides: In reviewing all these references, it is clear that the use of TMCDA to form polyimides, copolyimides, polyimides-amides and copolyimides-amides, useful as moldings, films, fibers, laminates, and coatings has not been contemplated in the prior art.

The general object of this invention is to provide novel polyimides-amides and copolyimides-amides based on TMCDA dicarboxylic acids and a mixture of diamine moieties. A more specific object of this invention is to provide polyimides, copolyimides from TMCDA moieties and mixtures of aliphatic, cycloaliphatic, araliphatic and aromatic moieties. Another object is to provide a process for the manufacture of polyimidesamides, from TMCDA, dicarboxylic acids and a mixture of diamines.

We have found that novel polyimides-amides can be formed by reacting TMCDA with a mixture of diamines and diacids. TMCDA reacts readily with the diacids and the diamine mixture to form high molecular weight polyimide-amides or copolyimide-amides. In the novel process both aliphatic and aromatic diamines can be copolymerized with TMCDA and dicarboxylic acid in the melt to form high molecular weight polyamide-imides.

Our process for the manufacture of the novel polyimides-amides comprises reacting about equal molar amounts of the total TMCDA and dicarboxylic acid with a primary diamine or a mixture of primary diamines. The molecular ratio of TMCDA and dicarboxylic acid to the mixture of primary diamines may be in the range of about 1.3:1.0 to about 1.0:1.3 preferably, in the range of about 1.00 to 1.00. The molecular ratio of TMCDA to the dicarboxylic acid can be in the range of about 1:10 to about 10:1. Suitably, the reaction is conducted as a batch reaction at a temperature of about 130° to 300° C. for a period of about 0.25 to 6.0 hours in a nitrogen-containing organic polar solvent such as 1-methyl-2-pyrrolidinone (NMP), N,N-dimethylacetamide or pyridine. The polycondensation can also be carried out as a continuous process. The polycondensation can suitably be carried out at a temperature of about 0° C. to about 200° C., preferably at a temperature of about 50° to about 100° C. The novel copolyimides-copolyamides of this invention have the following recurring structure:

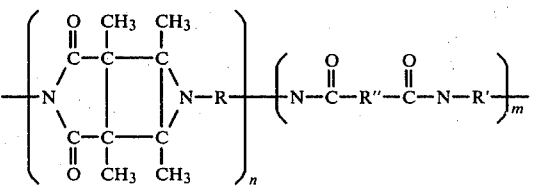

wherein R, R' and R" are divalent aliphatic or aromatic hydrocarbon radicals. The radicals R, R' and R" are the same or different and may be divalent aliphatic hydrocarbons of 2 to 18 carbon atoms or an aromatic hydrocarbon from 6 to 20 carbon atoms, or an aromatic hydrocarbon radical containing from 6 to 10 carbon atoms joined directly or by stable linkage comprising —O—, methylene,

—SO—, —SO$_2$—, and —S— radicals. It should be noted that n and/or m integers from about 1 to about 10 and the ratio of n:m is about 10:1 to about 1:10. The radicals R and R' are derived from aliphatic, araliphatic or cycloaliphatic diamines such as ethylenediamine, propylenediamine, 2,2-dimethylpropylene diamine, tetramethylene diamine, hexamethylene diamine, octamethylene diamine, nonamethylene diamine, decamethylene diamine, dodecamethylene diamine, 4,4'-diaminodicyclohexylethane, xylylene diamine and bis-(aminomethyl)cyclohexane. Suitable aromatic diamines useful in our process include para- and -meta-phenylenediamine, 4,4'-oxydianiline, thiobis (aniline), sulfonylbis (aniline), diaminobenzophenone, methylene-bis (aniline), benzidine, 1,5-diaminonaphthalene, oxybis (2-methylaniline), thiobis (2-methylaniline), and the like. Examples of other useful aromatic primary diamines are set out in U.S. Pat. No. 3,494,890 (1970) and U.S. Pat. No. 4,016,140 (1972) both incorporated herein by reference. The preferred diamine mixtures are 1,6-hexamethylenediamine and 1,12-dodecanediamine, 1,6-hexamethylenediamine and 4,4'-oxydianiline, 1,12-dodecanediamine and 4,4'-oxydianiline and 1,6-hexamethylenediamine and ethylene diamine. The ratio of the two diamines may be in the range of 19:1 to 1:19 preferably 3:1 to 1:3.

R" is derived from suitable dicarboxylic acids comprising the following structure:

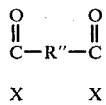

where X is OH, Cl, or O alkyl wherein the alkyl group comprises about 1 to about 5 carbon atoms and R" is a divalent aromatic or aliphatic radical. Advantageously R" is a divalent aliphatic hydrocarbon containing about 2–18 carbon atoms or an aromatic divalent radical containing about 1–3 benzene rings, or heterocyclic hydrocarbon or a mixture of these. The R" moiety is derived from aromatic diacids or their halides or esters such as oxalic acid, glutaric acid, adipic acid, azelaic acid, terephthalic acid, isophthalic acid, biphenyl-4,4'-dicarboxylic acid, 2,6-naphthalene dicarboxylic acid, and pyridine-2,4- and 3,5-dicarboxylic acid.

In some cases the polyimide-amides or the copolyimides may be further polymerized under "solid state polymerization" conditions. The term solid state polymerization refers to chain extensions of polymer particles under conditions where the polymer particles retain their solid form and do not become a fluid mass. The solid state polymerization can be carried out below the melting point of the polymer or copolymer and can be conducted in several ways. However, all techniques require heating the ground or pelletized polymer below the melting point of the polymer, generally at a temperature of about 200° to 300° C. while either sparging with an inert gas, such as nitrogen or operating under vacuum. In cases where the polymer has a low melt temperature, it can be polymerized in the melt under vacuum in thin sections or using thin film reactors known in the art.

Injection molding of the novel polyimides, copolyimides, polyimide-amides and copolyimide-amide is accompanied by injecting the polymer into a mold maintained at a temperature of about 23° to 200° C. In this process a 20 second to 1 minute cycle is used with a barrel temperature of about 200° C. to 350° C. The latter will vary depending on the $T_g$ and $T_m$ of the polymer being molded.

The novel polyimides, copolyimides, polyimide-amides and copolyimide-amides have excellent mechanical and thermal properties and can readily be molded into useful articles or formed into fibers, films, laminates or coatings.

Analysis of the TMCDA-based polyimides and polyimide-amides by thermal gravimetric analysis shows excellent stability. This is demonstrated by the fact that under nitrogen atmosphere the 1 percent weight loss occurs at a temperature of 310° C. and main weight loss occurs at a temperature of about 390° C. Glass transition temperature $T_g$ of the polyimide varied with the particular diamine used as shown in the Examples.

Diamines with the amino groups attached directly to the aromatic ring are suitably copolymerized with TMCDA and diacids by solution condensation in organic polar solvents. Useful polar solvents include N,N-dimethylacetamide, 1-methyl-2-pyrrolidinone, N,N-dimethylformamide, dimethylsulfoxide and the like.

The polymers and copolymers were cast into films. The films were heated at a temperature of about 200° C. for 10 minutes. The dry film was 10 mm in thickness and was transparent.

We have found that the polymers and copolymers of this invention are improved by the addition of reinforcing material particularly, the mechanical properties of the polymers and copolymers are improved if these polymers and copolymers contain from about 25 to about 60 percent by weight glass fibers, glass beads, industrial minerals, such as talc or graphite or mixtures thereof. In the preferred range the polymers and copolymers contain about 30 to about 40 percent by weight of the glass fibers, glass beads, industrial minerals or graphite or mixtures thereof. Suitably reinforcing materials can be glass fibers, glass beads, glass spheres, glass fabrics. The glass fibers are made of alkali-free boron-silicate glass or alkali-containing C-glass. The thickness of the fiber is suitably on the average between 3 and 30 mm. It is possible to use both long fibers with average lengths of from 5 to 50 mm and also short fibers with an average filament length from 0.05 to 5 mm. In principle, any standard commercial-grade fibers, especially glass fibers, may be used. Glass beads ranging from 5 to 50 mm in diameter may also be used as a reinforcing material.

The reinforced polymers and copolymers may be prepared in various ways. For example, so-called rovings endless glass fiber strands are coated with the polyamic acid melt and subsequently granulated. The cut fibers or the glass beads may also be mixed with granulated polyamic acid and the resulting mixture melted in a conventional extruder, or alternatively the fibers may be directly introduced into the polyamic acid melt through a suitable inlet in the extruder. Injection molding of the novel glass-filled polymers and copolymers is accomplished by injecting the polyimide into a mold maintained at a temperature of about 23° to 200° C. In this process a 25 to 28 second cycle is used with a barrel temperature of about 200° to 350° C. The injection molding conditions are given in Table 1.

TABLE I

| | |
|---|---|
| Mold Temperature | 23° to 200° C. |
| Injection Pressure | 15,000 to 19,000 psi and held for 1 to 3 seconds |
| Back Pressure | 100 to 220 psi |
| Cycle Time | 25 to 28 seconds |
| Extruder: | |
| Nozzle Temperature | 200° to 350° C. |
| Barrels: | |
| Front heated to | 200° to 350° C. |
| Screw: | |
| 20 to 25 revolutions/minute | |

The following examples illustrate the preferred embodiment of the invention. It will be understood that the examples are for illustrative purposes only and do not purport to be wholly definitive with respect to conditions or scope of the invention.

EXAMPLE 1

The dianhydride, TMCDA, was prepared from maleic anhydride according to literature procedures. Treatment of maleic anhydride in boiling acetic acid and in the presence of 2-aminopyridine gives decarboxylation 2,3-dimethylmaleic anhydride (M. E. Baumann and H. Bosshard, *Helv. Chem. Acta.*, 16, 2751 (1978)). This compound is then converted to its dimer by irradiating its benzene solution sensitized by benzophenone with ultraviolet light for several hours (G. D. Schenk, W. Hartmann, S. P. Mansfeld, W. Metzner, and C. H. Krauch, *Chem. Ber.*, 95, 1642 (1962)). The resulting photodimer was recrystallized from acetic anhydride.

The literature procedure was improved by using a weak UV source through Pyrex.

EXAMPLE 2

A mixture of 2.52 g (0.01 mole) of TMCDA and 1.94 g (0.01 mole) of dimethyl terephthalate was added in one portion to a solution of 2.0 g (0.01 mole) of oxybisaniline and 2.0 g (0.01 mole) of 1,12-dodecanediamine in 70 ml of xylene and 70 ml of N-methylpyrrolidinone (NMP) at 85° C. with stirring under a stream of nitrogen at 50 cc/min.

The mixture was refluxed with take-off till all the xylene had distilled; heating was continued to 185°–190° C. and held there for 15 hours. The cooled solution was added to a blender containing 400 ml of water. The resulting solid copolyimide-copolyamide was collected on a filter, washed with water, and dried in a vacuum oven at 85° C. It weighed 6.64 g (89% yield) and had an inherent viscosity in 60:40 phenol:tetrachloroethane of 0.56.

Analysis: Calculated for $(C_{68}H_{82}N_8O_{14})_{17}$, C, 66.1; H, 6.6; N, 9.1. Found: C, 65.3; H, 6.5; N, 9.0.

EXAMPLE 3

A stirred mixture of 5.04 g (0.02 mole) of TMCDA and 1.94 g (0.01 mole) of dimethyl isophthalate in 85 ml of NMP at 90° C. was treated with a mixture of 3.0 g (0.015 mole) of oxybisaniline and 3.72 g (0.015 mole) 4,4′-diaminodiphenylsulfone. The temperature was raised to 185° C. over 2 hours. Stirring and heating were continued for 18 hours at 185°–200° C. while 17 ml distilled, cooled to 60° C. and poured into 400 ml of water in a blender. The precipitated copolyimide-copolyamide was collected on a filter, washed with water, and dried in vacuo at 100° C. It weighed 11.35 g (92% yield), and had an inherent viscosity of 0.48.

Analysis: Calculated for $(C_{88}H_{88}N_8O_{18}S_2)_{17}$, C, 65.7; H, 5.5; N, 7.0; S, 4.0. Found: C, 65.1; H, 5.3; N, 6.7; S, 3.6.

EXAMPLE 4

To a stirred solution of 4.0 g (0.02 mole) of 1,12-dodecanediamine and 1.2 g (0.02 mole) of ethylene diamine in 90 ml. NMP at 80° C. was added a mixture of 5.04 g (0.02 mole) of TMCDA and 2.92 g (0.02 mole) of adipic acid. Temperature was increased to 185° C. over 3 hours and kept at 185°–200° C. for 14 hours. The solution was cooled to 80° C. and poured into 400 ml of water in a blender. The off-white copolyimide-copolyamide was collected on a filter, washed with water, and dried in vacuo at 90° C. overnight. It weighed 11.25 g (96% yield) and had an inherent viscosity of 0.84.

Analysis: Calculated for $(C_{64}H_{100}N_8O_{12})$, C, 66.7; H, 8.3; N, 9.2. Found: C, 66.2; H, 8.3; N, 9.1.

EXAMPLE 5

A mixture of 2.52 g (0.01 mole) of TMCDA and 1.94 g (0.01 mole) of dimethyl terephthalate was added in one portion to a solution of 4.0 g (0.02 mole) of oxybisaniline in 70 ml of N-methylpyrrolidinone (NMP) at 85° C. with stirring under a stream of nitrogen at 50 cc/min. Heating was increased to 180° C. and the mixture was stirred and refluxed for 22 hours, then cooled to 95° C. and poured into 200 ml of water stirred in a blender. The polyimide-polyamide was collected on a filter, washed 3 times with 150 ml portions of water, and dried in vacuo at 100° C. for 2 hours. It weighed 6.92 g (93% yield).

Analysis: Calculated for

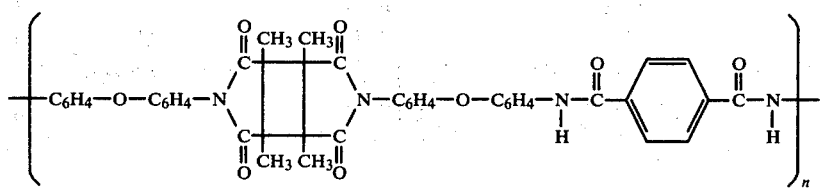

C, 70.8; H, 4.6; N, 7.5. Found: C, 70.6; H, 4.1; N, 7.2.

The inherent viscosity in 60/40 phenol-tetrachloroethane was 0.55.

EXAMPLE 6

To a stirred suspension of 2.52 g (0.01 mole) of TMCDA and 3.84 g (0.02 mole) of dimethyl isophthalate in 50 ml of NMP at 25° C. under N₂ at 50 cc/min was added a solution of 3.48 g (0.03 mole) of 1,6-hexanediamine in 10 ml of NMP dropwise over 10 minutes. The mixture was heated to reflux over 1.5 hours and refluxed while 15 ml of solvent was allowed to distill over 2 hours, then for another 15 hours. The solution was cooled to 80° C., poured into 200 ml of water stirred in a blender, filtered, washed with 3 portions of 100 ml of water (60° C.), and dried in vacuo at 90° C. for 10 hours. The light-cream colored polymer (polyimide-polyamide) weighed 7.46 g (91% yield) and had an intrinsic viscosity of 0.49.

Analysis: Calculated for $(C_{46}H_{60}N_6O_8)_n$,

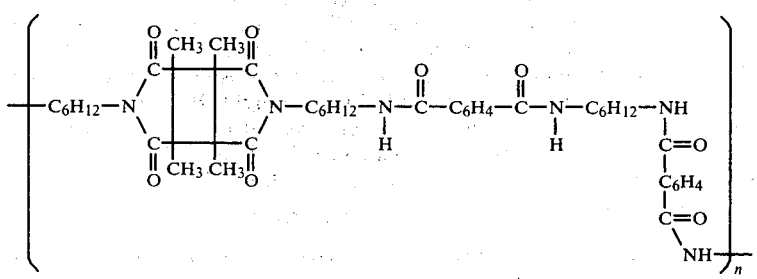

C, 67.0; H, 7.3; N, 10.2. Found: C, 66.4; H, 7.1; N, 9.8.

EXAMPLE 7

To a stirred solution of 6.0 g (0.03 mole) of 1,12-dodecanediamine in 60 ml of NMP at 40° C. under $N_2$ at 50 cc/min. was added a mixture of 5.04 g (0.02 mole) of TMCDA and 1.46 g (0.01 mole) of adipic acid. The mixture was heated to 180° C. over 2 hours, kept at 185°-200° C. for 12 hours longer, during which time 15 ml distilled, cooled to 70° C., and poured into 400 ml of water in a blender. The solid was collected on a filter, washed with 4 100 ml portions of water, and dried in vacuo at 95° C. The white polyimide-polyamide had an intrinsic viscosity of 0.68, weighed 10.9 g (95.4% yield), and anlayzed for

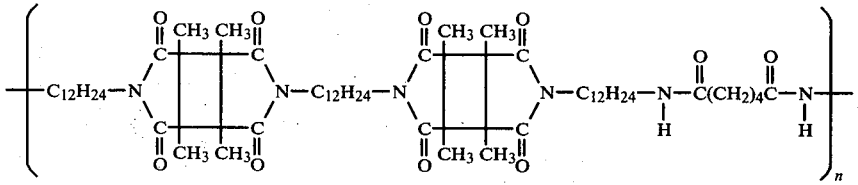

Calculated for $C_{66}H_{106}N_6O_{10}$, C, 69.4; H, 9.3; N, 7.4. Found: C, 68.8; H, 9.0; N, 7.1.

We claim:

1. A polymer comprising the following recurring structure

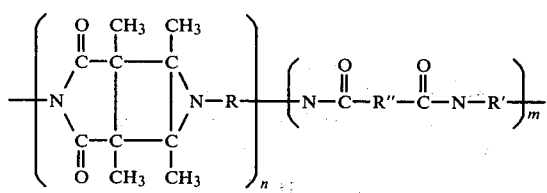

wherein R, R' and R" are the same or different divalent aliphatic or aromatic hydrocarbon radicals and n and m are the same or different integers from about 1:10 to about 10:1.

2. The polymer of claim 1 wherein R and R' are different aliphatic hydrocarbons from about 2 to about 18 carbon atoms.

3. The polymer of claim 1 wherein R and R' are different aromatic hydrocarbons from about 6 to about 20 carbon atoms.

4. The polymer of claim 1 wherein R" is a divalent aromatic hydrocarbon comprising about 6 to about 8 carbon atoms.

5. The polymer of claim 1 wherein the polymer is in the form of a molded object.

6. A polymer molding composition comprising the polymer of claim 1 wherein the molding composition contains from about 30 to 50 weight percent of either glass fibers, glass beads, or graphite or a mixture thereof.

7. The polymer of claim 1 wherein the polymer is in the form of a laminate.

8. The polymer of claim 1 wherein the polymer is in the form of a fiber.

9. The polymer of claim 1 wherein the polymer is in the form of a film.

10. The polymer of claim 1 wherein the polymer is in the form of a metal coating suitable for electrical service.

11. A polymer of claim 1 wherein R is $-(CH_2)_6-$ and R' is $-(CH_2)_{12}-$.

12. A polymer of claim 11 wherein the polymer is in the form of a molded object.

13. A polymer molding composition comprising the polymer of claim 11 where the molding composition contains from about 30 to 50 weight percent of either glass fibers, glass beads, or graphite or a mixture thereof.

14. The polymer of claim 11 wherein the polymer is in the form of a laminate.

15. The polymer of claim 11 wherein the polymer is in the form of a fiber.

16. The polymer of claim 11 wherein the polymer is in the form of a film.

17. A polymer of claim 1 wherein R is $-(CH_2)_6-$ and R' is $-(CH_2)_2-$.

18. A polymer of claim 17 wherein the polymer is in the form of a molded object.

19. The polymer of claim 17 wherein the polymer is in the form of a laminate.

20. The polymer of claim 17 wherein the polymer is in the form of a fiber.

21. The polymer of claim 17 wherein the polymer is in the form of a film.

22. A polymer of claim 1 wherein R is ,

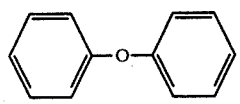
and R' is —(CH$_2$)$_{12}$—.
23. The polymer of claim 22 wherein the polymer is in the form of a molded object.
24. The polymer of claim 22, wherein the polymer is in the form of a laminate.
25. The polymer of claim 22 wherein the polymer is in the form of a fiber.
26. The polymer of claim 22 wherein the polymer is in the form of a film.
* * * * *

UNITED STATES PATENT OFFICE
CERTIFICATE OF CORRECTION

Patent No. 4,410,658   Dated October 18, 1983

Inventor(s) Tayseer S. Nimry and Ellis K. Fields

It is certified that error appears in the above-identified patent and that said Letters Patent are hereby corrected as shown below:

Patent reads:

| Col. | Line | | |
|---|---|---|---|
| 1 | 50 | "polyimidesamides" should read | --polyimides-amides-- |
| 2 | 7 | "1-methyl-2-pyrrolidinone" should read | --1-methyl-2 pyrrolidinone-- |
| 8 | 28 | "$-(CH_2)\overline{_6}-$" should read | "$-(CH_2)_6-$" |
| 8 | 44 | "$-(CH_2)\overline{_{12}}-$" should read | "$-(CH_2)_{12}-$" |
| 8 | 58 | "$-(CH_2)\overline{_6}-$" should read | "$-(CH_2)_6-$" |
| 8 | 59 | "$-(CH_2)\overline{_2}-$" should read | "$-(CH_2)_2-$" |

Signed and Sealed this

*Eighth* Day of *May 1984*

[SEAL]

Attest:

GERALD J. MOSSINGHOFF

*Attesting Officer*   *Commissioner of Patents and Trademarks*